UNITED STATES PATENT OFFICE.

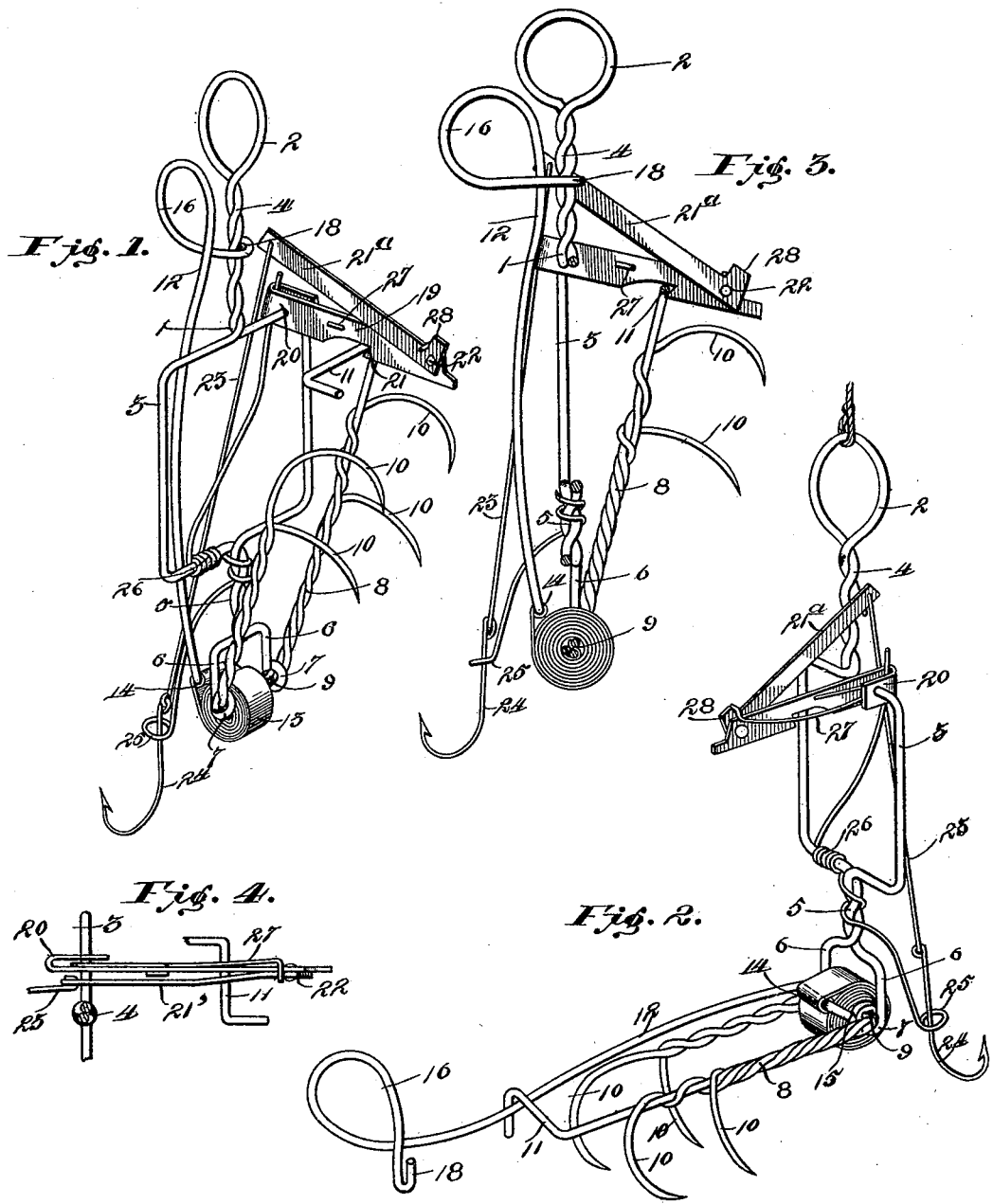

SAMUEL M. NEELY, OF CHESTER, SOUTH CAROLINA.

FISH-HOOK.

SPECIFICATION forming part of Letters Patent No. 635,503, dated October 24, 1899.

Application filed March 11, 1899. Serial No. 708,715. (No model.)

*To all whom it may concern:*

Be it known that I, SAMUEL M. NEELY, a citizen of the United States, residing at Chester, in the county of Chester and State of South Carolina, have invented a new and useful Fish-Hook, of which the following is a specification.

The invention relates to improvements in fish-hooks.

The object of the present invention is to improve the construction of fish-hooks and to provide a simple, inexpensive, and efficient one adapted to be baited both for fish and for animals and capable, when the bait is pulled upon, of impaling a fish or animal and of thereby effectually preventing it from escaping.

The invention consists in the construction and novel combination and arrangement of parts, hereinafter fully described, illustrated in the accompanying drawings, and pointed out in the claims hereto appended.

In the drawings, Figure 1 is a perspective view of a fish-hook constructed in accordance with this invention and illustrating the arrangement of the parts when set. Fig. 2 is a similar view showing the spring-actuated frame connected with the lever preparatory to setting the device. Fig. 3 is a longitudinal sectional view, the parts being arranged as shown in Fig. 1. Fig. 4 is a transverse sectional view.

Like numerals of reference designate corresponding parts in all the figures of the drawings.

1 designates a frame preferably constructed of a single piece of stout wire doubled between its ends to form an eye or ring 2 and separated near the center of the frame to form a substantially rectangular loop 3, and the wire is twisted at the ends of the loop at 4 and 5 and has its terminals extended to form a pair of arms 6. Instead of constructing the frame of wire other suitable material may be employed, and the eye or ring 2 is designed to be attached to a fishing-line, or it may be anchored or staked at a suitable point when the device is employed for catching animals. The arms 6, which are provided at their terminals with eyes 7, support a substantially U-shaped spring-actuated frame 8, having a transverse portion 9 passing through the eyes 7 and forming a pintle for hinging the frame 8 to the main frame 1.

The spring-actuated frame, which is preferably constructed of twisted wire, is provided at each side with hooks 10, for a purpose hereinafter described, and it has at its outer end a substantially L-shaped arm 11, adapted to interlock with a lever 12. The spring 13, which actuates the frame 8, is mounted between the arms 6 and is coiled, as shown, its inner end being attached to the transverse portion of the frame 8 and its outer end 14 being secured to the lever 12 near the inner end thereof. The lever 12, which is provided at its inner end with an eye 15, is fulcrumed on the transverse portion of the frame 8 at one side of the barrel-spring, and it is angularly bent and laterally offset to provide a transverse portion, which extends through the eye of the outer end of the spring. The outer end of the lever is coiled to form an eye or loop 16, and the terminal of the wire of which the lever is constructed is bent to form a hook 18, arranged at the inner side of the eye or loop 16 and adapted to engage the stem portion 4 of the frame 1, whereby the lever is connected with the same when the trap is set, as clearly illustrated in Figs. 1 and 3 of the accompanying drawings.

A catch 19, which is adapted to engage the spring-actuated frame 8, is pivotally mounted on the main frame at the upper side of the loop 3, and consists of a bar or strip of metal having its lower end 20 bent upon itself and perforated to receive the loop 3, whereby it is pivoted to the frame 1. The catch is recessed at one of its edges to provide a shoulder 21 to engage the L-shaped arm 11 of the swinging frame, and a trigger 21ᵃ is pivoted at its outer end at 22 to the outer end of the catch, and its inner end is connected by a wire or rod 23 with a bait-receiving hook 24, passing through a guide 25. The guide 25 consists of an arm provided at its outer end with an eye and constructed of wire, which is coiled around one end of the loop 3 at 26 and which is extended along the frame 1, the inner terminal of the wire being arranged in the bend or loop of the inner end of the catch.

A spring 27, which is mounted on the catch, has one end engaging an arm 28 of the trigger, and this spring 27, which is substantially U-shaped, receives the loop 3 in its bend and has one side secured to the catch, and its other side, which engages the trigger, is provided at its outer end with an L-shaped arm.

The trap is set by engaging the lever with the L-shaped arm of the spring-actuated frame and swinging the latter into engagement with the shoulder of the catch. The lever is then brought around to the opposite side of the frame and its hook is engaged therewith. This winds up the spring 9, and as soon as the bait-receiving hook is pulled upon, the trigger, which operates as a lever, swings the catch out of engagement with the spring-actuated frame, which, being released, is swung around by the spring and its hook-shaped prongs are embedded in the body of the fish or animal. It is impossible for an animal to escape after being impaled on the hook-shaped prongs, and as the latter are not provided with barbs they may be readily disengaged from the victim.

The invention has the following advantages: The fish-hook, which is simple and comparatively inexpensive in construction, is positive and reliable in operation and is adapted to be employed for catching various kinds of game, and as soon as the bait-holder or hook 24 is pulled upon, the spring-actuated frame will be released and will effectually prevent the escape of a fish or animal. The lever, which is interlocked with the frame, enables the device to be readily set without liability of a person accidentally springing the trap and inflicting an injury on himself.

Changes in the form, proportion, size, and the minor details of construction within the scope of the appended claims may be resorted to without departing from the spirit or sacrificing any of the advantages of this invention.

What is claimed is—

1. A device of the class described comprising a frame 1, a spring-actuated frame mounted on the frame 1 and provided with prongs, a lever fulcrumed on the frame 1 and arranged to engage the spring-actuated frame, to set the device, and means for setting and tripping the spring-actuated frame, substantially as described.

2. A device of the class described comprising a main frame, a swinging frame mounted on the main frame and provided with prongs, a lever arranged to engage the swinging frame and adapted to interlock with the main frame, a spring connected with the lever and with the swinging frame, and means for setting and tripping the latter, substantially as described.

3. A device of the class described comprising a main frame, a swinging frame mounted thereon and provided with prongs, a lever fulcrumed on the main frame, a spring connected with the lever and with the swinging frame, a catch mounted on the main frame and arranged to engage the swinging frame, a trigger arranged to disengage the catch from the swinging frame, and a bait-holder connected with the trigger, substantially as described.

4. A device of the class described comprising a main frame, a spring-actuated frame having prongs, a trigger, a bait-holder connected with the trigger, and a catch adapted to engage the spring-actuated frame and arranged to be operated by the trigger to release the said spring-actuated frame, substantially as described.

5. A device of the class described comprising a main frame, a catch pivotally mounted thereon, a spring-actuated frame engaged by the catch, a trigger connected with the catch and fulcrumed on the main frame, and a bait-holder connected with the trigger, substantially as described.

6. A device of the class described comprising a main frame, a spring-actuated frame, a catch pivotally mounted on the main frame and arranged to engage the spring-actuated frame, a trigger pivoted to the catch and fulcrumed on the main frame, a spring engaging the trigger, and a bait-holder connected with the same, substantially as described.

7. A device of the class described comprising a main frame, a spring-actuated frame provided at opposite sides with hook-shaped prongs, a catch arranged to engage the spring-actuated frame, a trigger connected with the catch, and a bait-receiving hook connected with the trigger and located at the center of the device, substantially as described.

8. A device of the class described comprising a main frame, a swinging frame provided with prongs and having an arm at its outer end, a spring connected with and adapted to actuate the swinging frame, a lever connected with the spring and arranged to engage the arm of the swinging frame and provided with a hook adapted to interlock with the main frame, a catch for holding the swinging frame, and means for tripping the same, substantially as described.

9. A device of the class described comprising a main frame provided with a loop and having arms at one end, a swinging frame journaled on the arms, a lever fulcrumed adjacent to one of the arms, a spring arranged between the arms and connected with the lever and with the swinging frame, and means for setting and tripping the latter, substantially as described.

10. A device of the class described comprising a main frame constructed of a single piece of wire, doubled to form an eye, and twisted at opposite sides of the center and spread at that point to form a loop, the terminals of the wire being extended to form arms, a swinging frame fulcrumed on the arms, a spring for actuating the same, a catch mounted on the loop, and arranged to engage the swinging frame, a trigger connected with the catch and arranged to be fulcrumed on the loop, and a bait-holder connected with the trigger, substantially as described.

In testimony that I claim the foregoing as my own I have hereto affixed my signature in the presence of two witnesses.

SAMUEL M. NEELY.

Witnesses:
W. O. GRAY,
ARTHUR E. CONWELL.